US008200479B2

(12) United States Patent
Sintes et al.

(10) Patent No.: US 8,200,479 B2
(45) Date of Patent: Jun. 12, 2012

(54) METHOD AND SYSTEM FOR ASYMMETRIC INDEPENDENT AUDIO RENDERING

(75) Inventors: Stephane Sintes, Cannes (FR); Franck Seigneret, Saint-Jeannet (FR); Christophe Favergeon-Borgialli, Nice (FR)

(73) Assignee: Texas Instruments Incorporated, Dallas, TX (US)

( * ) Notice: Subject to any disclaimer, the term of this patent is extended or adjusted under 35 U.S.C. 154(b) by 685 days.

(21) Appl. No.: 12/342,327

(22) Filed: Dec. 23, 2008

(65) Prior Publication Data

US 2009/0204413 A1 Aug. 13, 2009

(51) Int. Cl.
*G10L 19/00* (2006.01)
*G10L 21/00* (2006.01)
*G10L 11/00* (2006.01)
*G10L 19/14* (2006.01)

(52) U.S. Cl. .................. 704/201; 704/200; 704/211

(58) Field of Classification Search .................. 704/200, 704/201, E13.005, E19.005; 381/119
See application file for complete search history.

(56) References Cited

U.S. PATENT DOCUMENTS

| | | | | |
|---|---|---|---|---|
| 6,301,366 B1 * | 10/2001 | Malcolm, Jr. et al. | ........ | 381/119 |
| 6,664,713 B2 * | 12/2003 | Boesen | ........ | 310/328 |
| 6,885,992 B2 * | 4/2005 | Mesarovic et al. | ........ | 704/500 |
| 6,917,318 B2 * | 7/2005 | Lambert | ........ | 341/131 |
| 7,236,599 B1 * | 6/2007 | Shi et al. | ........ | 381/22 |
| 8,010,214 B2 * | 8/2011 | Brennan | ........ | 700/94 |
| 2004/0037371 A1 * | 2/2004 | Brennan | ........ | 375/327 |
| 2004/0068400 A1 * | 4/2004 | Gupta | ........ | 704/201 |
| 2007/0043804 A1 * | 2/2007 | Fibaek | ........ | 709/201 |

* cited by examiner

*Primary Examiner* — Talivaldis Ivars Smits
*Assistant Examiner* — Jesse Pullias
(74) *Attorney, Agent, or Firm* — Alan A. R. Cooper; Wade James Brady, III; Frederick J. Telecky, Jr.

(57) ABSTRACT

Methods and mobile devices are provided for asymmetric independent processing of audio streams in a system on a chip (SOC). More specifically, independent audio paths are provided for processors performing audio processing on the SOC and mixing of decoded audio samples from the processors is performed digitally on the SOC by a hardware digital mixer.

18 Claims, 10 Drawing Sheets

METHOD AND SYSTEM FOR ASYMMETRIC INDEPENDENT AUDIO RENDERING

CROSS-REFERENCE TO RELATED APPLICATIONS

This application claims priority from European Patent Application No. 08290123.2 filed on Feb. 8, 2008.

BACKGROUND OF THE INVENTION

Mobile phones are no longer just telephones. In addition to providing telephone functionality, they are also providing more complex applications (e.g., games, multimedia, music download and playback, video (with audio content) download and playback, web browsing, etc.) that require ever-increasing audio processing capabilities. Thus, improvements in hardware and software for audio processing in mobile phones and other mobile devices equipped for audio streaming are desired.

SUMMARY OF THE INVENTION

Embodiments of the invention provide methods and systems for asymmetric independent rendering of audio streams in mobile devices. More specifically, embodiments of the invention provide a method for processing audio streams in a mobile device comprising a system on a chip (SOC) where the method includes decoding a first audio stream by a first processor comprised in the SOC, decoding a second audio stream by a second processor comprised in the SOC, wherein the decoding of the first audio stream and the second audio stream is performed concurrently, digitally mixing decoded audio samples from the first audio stream and the second audio stream using a hardware digital mixer comprised in the SOC, wherein a composite audio stream is generated, and providing the composite audio stream to a digital to analog converter.

Embodiments of the invention further provide for a mobile device that includes a digital to analog convertor (DAC) and a system on a chip (SOC) operatively connected to the DAC. The SOC includes a first processor configured to decode a first audio stream, a second processor configured to decode a second audio stream, and a hardware digital mixer configured to mix decoded audio samples from the first audio stream and the second audio stream to generate a composite audio stream, wherein the first audio stream and the second audio stream are decoded concurrently and the composite audio stream is provided to the DAC.

Embodiments of the invention further provide for a mobile device that includes a digital to analog converter (DAC) and a system on a chip (SOC) operatively connected to the DAC. The SOC includes a first processor configured to decode a first audio stream, a second processor operatively connected to the first processor and configured to decode a second audio stream, and an audio backend operatively connected to the first processor by a first port and the second processor by a second port. The audio backend includes a memory configured to store a first audio buffer to receive decoded audio samples from the first processor and a second audio buffer to receive decoded audio samples from the second processor, and a hardware digital mixer configured to mix decoded audio samples from the first audio buffer and the second audio buffer to generate a composite audio stream, wherein the first audio stream and the second audio stream are decoded concurrently and the composite audio stream is provided to the DAC.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components of digital systems embodied in mobile and wireless devices may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Inasmuch as the systems and methods described herein were developed in the context of a mobile phone, the description herein is based on a mobile phone environment. However, the discussion of the various systems and methods in relation to a mobile phone environment should not be construed as a limitation as to the applicability of the systems and methods described herein to only mobile phone environments. One of ordinary skill in the art will appreciate that embodiments of these systems and methods may also be implemented in other mobile devices and wireless devices with audio streaming capability such as, for example, handheld gaming devices, iPods, MP3 players, and the like.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

Many mobile phones include two processors, a general purpose processor and a digital signal processor (DSP), both of which may be used to process audio streams. Typically, the audio mixing paths are not completely independent between the two processors. Thus, while both processors may be used to render audio streams, one processor, typically the general purpose processor, is the master processor for audio rendering and controls mixing of audio streams. In some implementations, the mixing is performed in software on the general purpose processor. In other implementations, the mixing is performed in analog. In addition, some synchronization, generally performed by software on the general purpose processor, is required as audio streams are processed on the two processors. This synchronization is necessary to ensure that the time it takes to render audio samples on the DSP and send them to the general purpose processor is taken into account so that the different audio streams are mixed with the right latencies.

Embodiments of the invention provide methods and systems for asymmetric independent processing of audio streams in mobile devices such as mobile phones in which synchronizations between two (or more) processors processing audio streams with differing characteristics (e.g., sample rate) is not needed. More specifically, in one or more embodiments of the invention, in a system-on-a chip (SOC) embodied in a mobile device, independent audio paths are provided for each processor performing audio processing (e.g., a DSP and a general purpose processor) and mixing of the audio samples from the processors is performed digitally by a hardware digital mixer. Further, the independent audio paths may include pre-processing of decoded audio samples (e.g., sample rate conversion) received from the processors prior to the mixing. In addition, post-processing (e.g., equalization) may be performed on the composite audio stream generated by the hardware digital mixer.

Figures 1A, 1A:
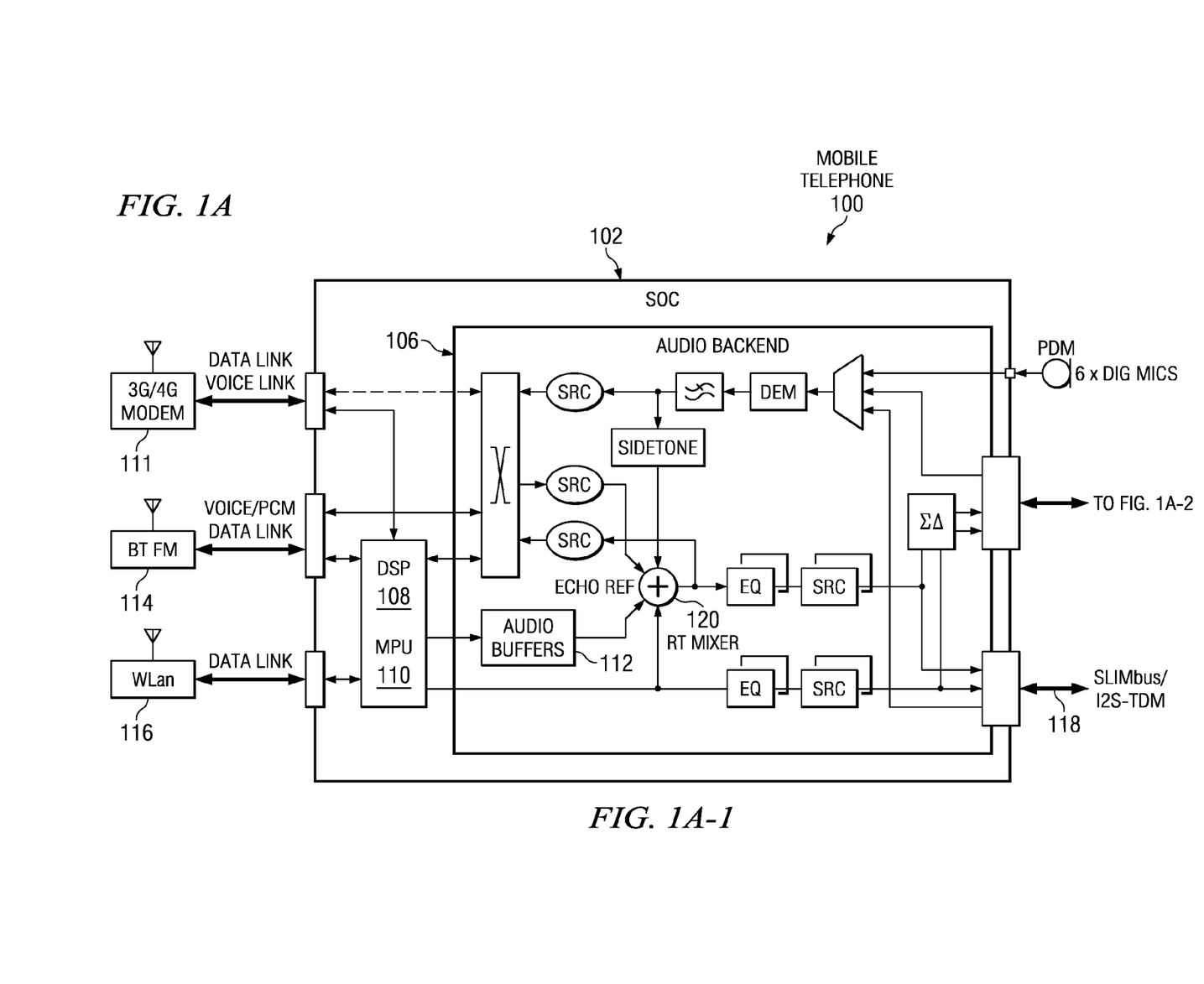
FIGS. 1A-1D show an illustrative mobile phone in accordance with one or more embodiments of the invention.
Figure 1A:
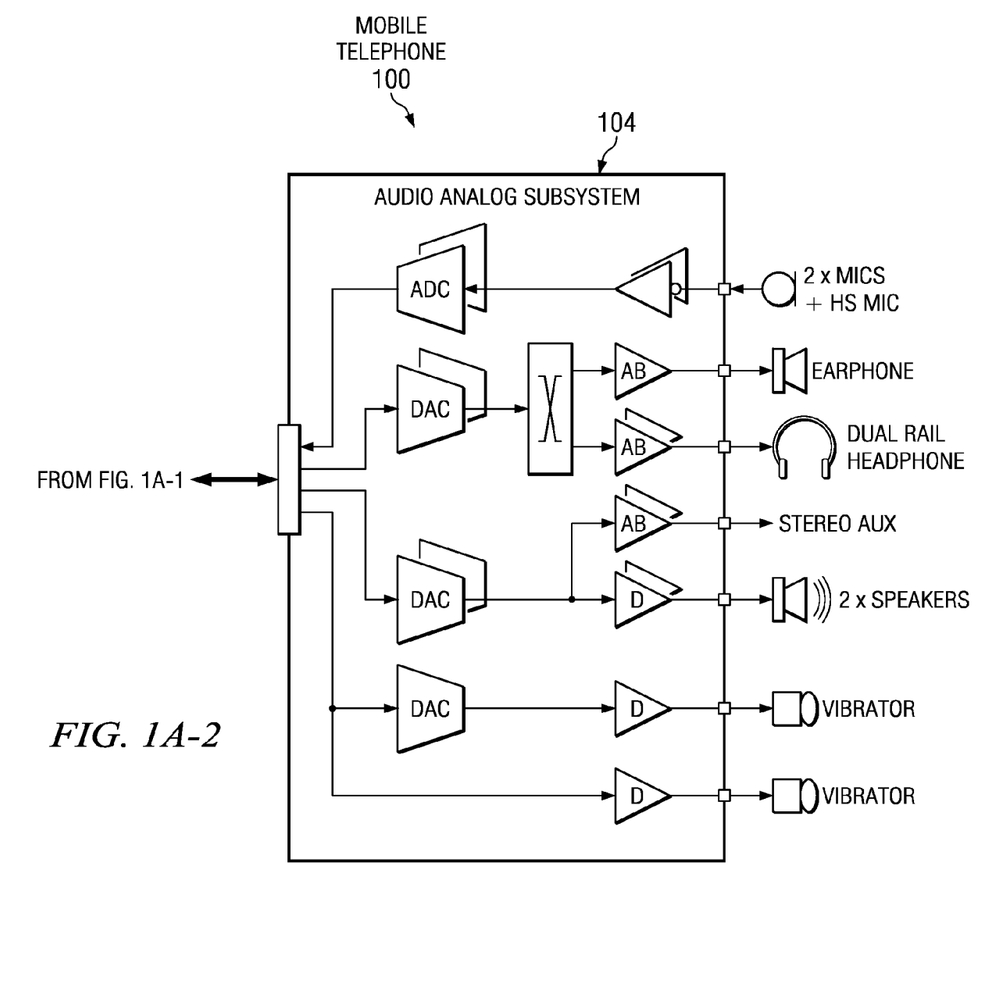

FIG. 1A is a block diagram of a mobile phone (100) configured to provide independent audio paths for two processors in accordance with one or more embodiments of the invention. The mobile phone (100) includes a system-on-a-chip (SOC) (102), an audio analog subsystem (104), and modem chipsets (111, 114, 116) coupled to antennas. The mobile phone (100) may also include various interfaces that are not specifically shown. The interfaces may include a USB interface that allows the mobile phone (100) to couple to and communicate with external devices, a camera interface which enables camera functionality for capturing digital images and/or video, and a data entry interface, such as a keyboard, keypad, or touch panel, and a display interface for displaying data, graphics, text, etc. Further, the mobile phone (100) may include external memory (not specifically shown) coupled to the SOC (102) and providing physical memory storage for software programs that execute on the SOC(102) and audio and/or video streams stored for playback.

The modem chipsets (111, 114, 116) provide functionality to send and receive voice and/or data and may include a 3G/4G chipset (111) providing connectivity for voice and data transfer according the third generation (3G) and fourth generation (4G) of mobile phone standards form the International Telecommunication Union (ITU) family of standards, a Bluetooth/FM chipset (114) providing Bluetooth and FM connectivity for voice and data transfer, and a wireless modem chipset (114) providing connectivity for data transfer in wireless networks. The audio analog subsystem (104) provides functionality convert digital audio samples from the SOC (102) to analog audio for delivery to various peripheral devices (e.g., earphones, headphones, stereo AUX inputs, speakers, and vibrators). The audio analog subsystem (104) also provides connectivity to convert analog audio from a microphone to a digital audio stream to be processed by the SOC (102).

The SOC (102) includes a main processing unit (MPU) (110) and a digital signal processor (108) coupled to an audio backend subsystem (106) via ports on an Open Core Protocol (OCP) compliant local interconnect. The SOC (102) also includes interfaces for various peripheral devices via standard busses (118) such as the Serial Low-power Inter-chip Media Bus (SLIMbus) and Inter-IC Sound (I2S). SLIMbus is a standard multi-channel digital audio interface between baseband or application processors and peripheral components in mobile devices. I2S is a standard digital audio interface for multiplexed stereo audio. The MPU (110) and the DSP (108) are also coupled to various other system components (not specifically shown) by way of data and instruction busses and/or various levels of OCP compliant interconnects. The MPU (110) may be any processor suitable for integration into an SOC and the DSP (108) may be any digital signal processor suitable for integration into an SOC.

The MPU (110) and the DSP (108) are configured to execute software digital audio functions for audio/voice data streaming in the SOC (102). In one or more embodiments of the invention, these software functions may include, among others, speech encoding and decoding for the 3G/4G modem (111), handling voice-over-internet-protocol (VoIP) transmissions to and from the wireless modem (116), decoding digital audio files encoded in various formats including Advanced Audio Coding (AAC), MP3, and Musical Instrument Digital Interface (MIDI) formats, tone generation, handling Advance Audio Distribution Profile (A2DP) transmissions to and from the Bluetooth modem (114), and generating 3D audio effects.

The audio backend subsystem (106) is configured to handle all hardware digital audio functions for audio/voice data streaming in the SOC (102). As is explained in more detail below, the audio backend subsystem (106) includes hardware and firmware to assist in the management of various audio and voice uplink and downlink streams between a host (i.e., the MPU (110), the DSP (108) or a direct memory access (DMA) channel (not specifically shown)) and various audio interfaces used for exchanging audio samples with digital-to-analog converters (DACs) and analog-to-digital converters (ADCs). In one or more embodiments of the invention, the audio backend subsystem (106) includes functionality to perform buffering of audio samples from the DSP (108) and the MPU (110) in the audio buffers (112), to mix digital audio with a digital voice down-stream and/or a microphone up-stream (real-time mixer (120), described in more detail below), and/or to perform post-processing such as equalization (EQ), bass-boost, and sample rate conversion (SRC).

Figure 1B:
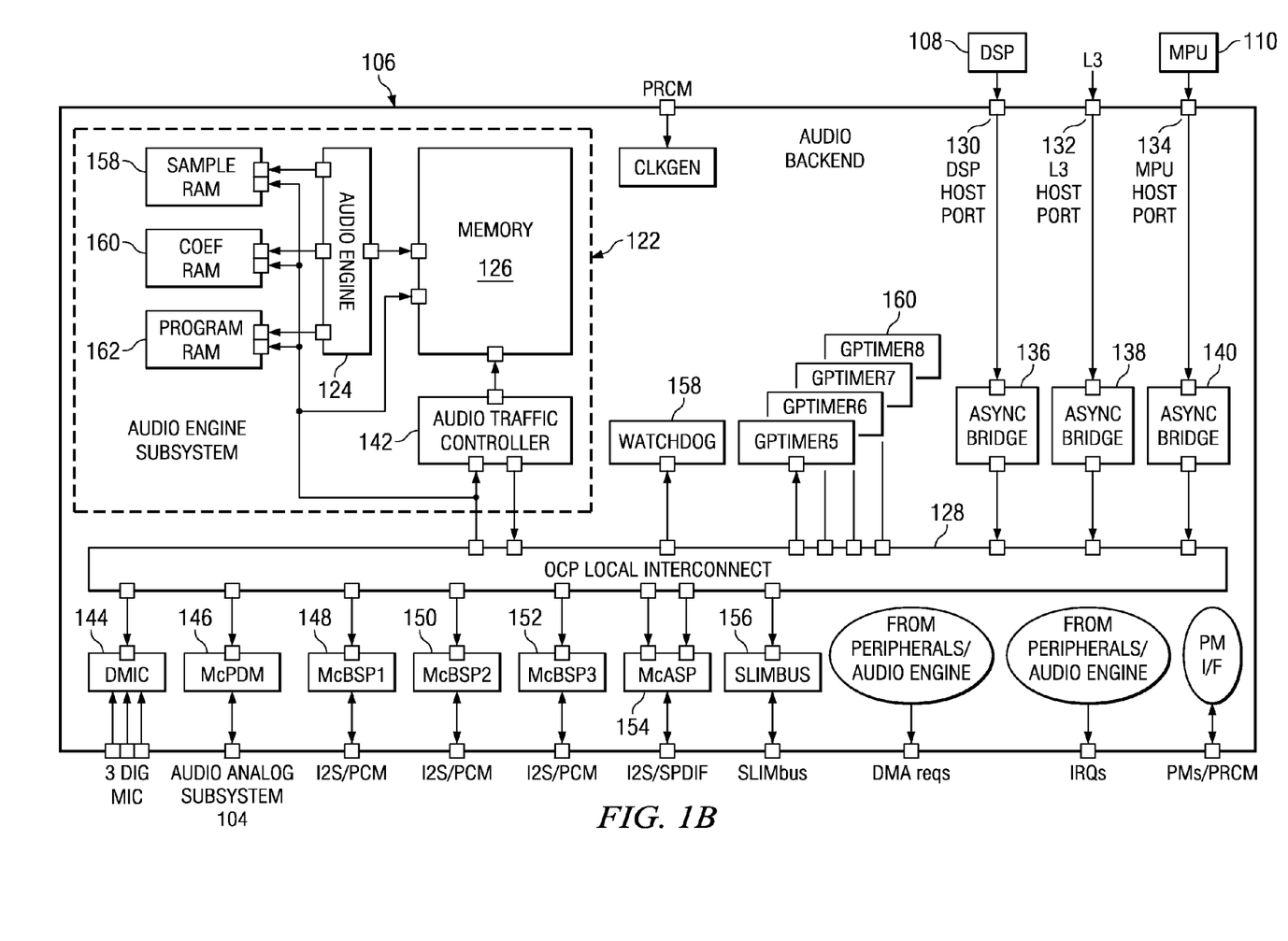

FIG. 1B shows various components of the audio backend (106) of FIG. 1A in more detail. The audio backend (106) includes an audio engine subsystem (122) coupled to various audio interfaces (144, 146, 148, 150, 152, 154, 156) and timers (158, 160) via a level 4 (L4) OCP compliant local interconnect (128). The DSP (108), the MPU (110), and the level three (L3) OCP compliant interconnect are coupled to the audio backend (106) through, respectively, the DSP host port (130), the MPU host port (132) and the L3 host port (134) and are coupled to the local interconnect (128) via asynchronous bridges (136, 138, 140). The L3 connection supports external DMA access. The local interconnect (128) is configured to manage data flow among the components of the audio backend (106). In one or more embodiments of the invention, the local interconnect includes four initiator port and ten target ports. The initiator ports are for the DSP (108), the MPU (110), L3, and the audio engine subsystem (122) and target ports are for the various audio interfaces (144, 146, 148, 150, 152, 154, 156).

The various audio interfaces include a digital microphone interface (144), a multi-channel pulse density modulation (McPDM) interface (146), three multi-channel buffered serial ports (McBSPs) (148, 150, 152), a multi-channel audio serial port (McASP) (154), and a SLIMbus interface (156). The digital microphone interface (144) supports up to three digital stereo microphones and includes functionality to extract audio samples from pulse-density modulated streams of bits received from the microphones. The McPDM interface (146) includes five downlink channels and three uplink channels for transferring audio samples between the audio analog subsystem (104) and the audio engine subsystem (122) and/or a host (e.g., the DSP (108), the MPU (110) or the L3 interconnect. Two additional uplink channels in the McPDM interface (146) are reserved for status communication. The three McBSPs (148, 150, 152) provide a full duplex direct serial interface between the audio backend (106) and external devices in the mobile phone (100) such as modems, Bluetooth chips, codecs, etc. In some embodiments of the invention, the McBSP1 interface (148) is used for Bluetooth voice and audio data, the McBSP2 interface (150) is used for voice data from a modem, and the McBSP3 interface (152) is used for MIDI FM data.

The McASP (154) functions as a general purpose audio serial port which may be used for both inter-chip (I2S modes) and inter-component (DIT) transmission. The SLIMbus interface (156) provides a bidirectional, multi-drop, multi-channel two-line serial interface between the audio backend (106) and up to seven off-chip components such as audio codecs, Bluetooth chipsets, FM radio receiver/transmitters, etc. The Slimbus interface (156) can accommodate a wide range of peripherals and clocked frame-oriented protocols (I2S, PCM, TDM).

The audio engine subsystem (122) includes an audio engine (124), a memory (126), an audio traffic controller (142), and three special purpose memories (158, 160, 162). The memory (126) is a consecutive random access memory (RAM) that is accessible by the audio engine (124) and the audio traffic controller (142). Further, the DSP (108), the MPU (110) and the DMA may access the memory (126) through the OCP local interconnect (128). In one or more embodiments of the invention, the size of the memory (126) is 64 KB.

The memory (126) is configured to store circular buffers of audio samples managed by the audio traffic controller (142), the stack of the audio engine (124), and an interrupt request (IRQ) configuration table. As is explained in more detail below, the memory (126) is also configured to receive and store data from a host (e.g., the MPU (110)) that indicates to the audio engine (124) which of the audio processing use cases stored in the program RAM (162) is to be executed. The memory (126) is also configured to store various buffers (e.g., ping/pong buffers) used to receive audio samples from the DSP (108) and/or the MPU (110) for processing by the audio engine (124) and a post buffer used to hold audio samples after mixing for further processing such as echo cancellation. The size of each of these buffers is programmable.

The three special purpose memories are the coefficient RAM (160), the sample RAM (158), and the program RAM (162). Each of these memories is accessible by the audio engine (128) and by other components in the audio backend (106) and the hosts (i.e., the DSP (108), the MPU (110), and the L3 interconnect via the OCP local interconnect (128). The coefficient RAM (160) is used to store coefficients needed for digital filtering processes stored in the program RAM (162). In one or more embodiments of the invention, the coefficients are tuned for the acoustic properties of components of the mobile phone (100).

The sample RAM (158) is configured to store PCM audio samples received from the various components in the audio backend (106) (e.g., the McBSPs (148, 150, 152)). The sample RAM (158) is used as working memory by the components of the audio backend (106).

The program RAM (162) is configured to store signal processing processes (e.g., filters, sample-rate converters, equalizers, side-tone) to be executed by the audio engine (124) to process audio signals. The program RAM (162) also stored audio processing use case definitions that may be invoked by a host in the SOC (102). An audio processing use case specifies the signal processing processes that are to be performed and the order in which they are to be performed for a specific audio processing event occurring on the mobile phone (100). Audio processing use cases may be defined, for example, for events such as a voice call occurring during MP3 playback, MP3 playback through the McPDM interface (146), MP3 playback when a ring tone occurs, a voice call managed by the DSP (108), etc. In operation, a host, e.g., the MPU (110), determines what use case is to be performed by the audio engine (124) based on current audio processing and incoming audio signals and loads data into the memory (126) that describes to the audio engine (124) which of the use cases to perform.

The audio traffic controller (172) is configured to manage the transfer of audio sample data between all components of the audio backend (106). More specifically, the audio traffic controller (172) is configured to perform data reads and data writes from/to memories and peripherals of the audio backend (106). The data reads and writes may include DMA requests from all components in the audio backend (106).

The audio engine (124) is configured to perform the real-time applications of the audio backend (106) such as mixing, muxing, filtering, volume control, smooth muting, anti-pop, acoustic protection, sample rate conversion, side-tone, and equalization. Processing in the audio engine (124) is based on a loop which is started when a predefined event occurs. The predefined start event may come from an event generator (not shown), from a mapped command from a host, or from an external DMA request. For example, an audio interface typically includes a FIFO queue to hold audio samples received from the audio backend (106). Samples are removed from the queue and sent to a device connected to the interface. When the queue content goes below a threshold, a DMA request is sent to the audio traffic controller (172) to refill the queue. In response to this request, the audio backend (106) initiates a processing loop to provide the samples.

Figures 1C, 1C:
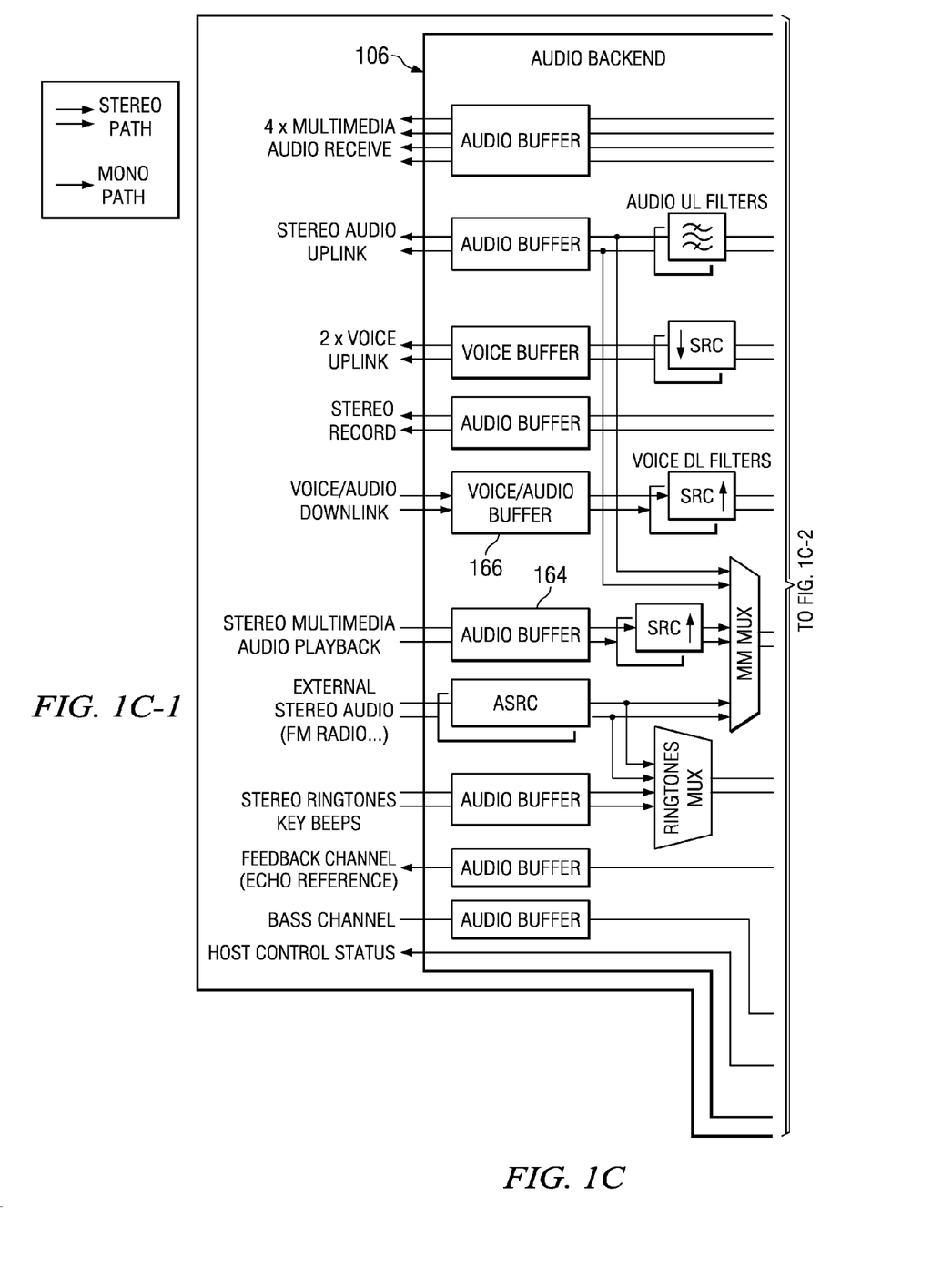
Figure 1C:
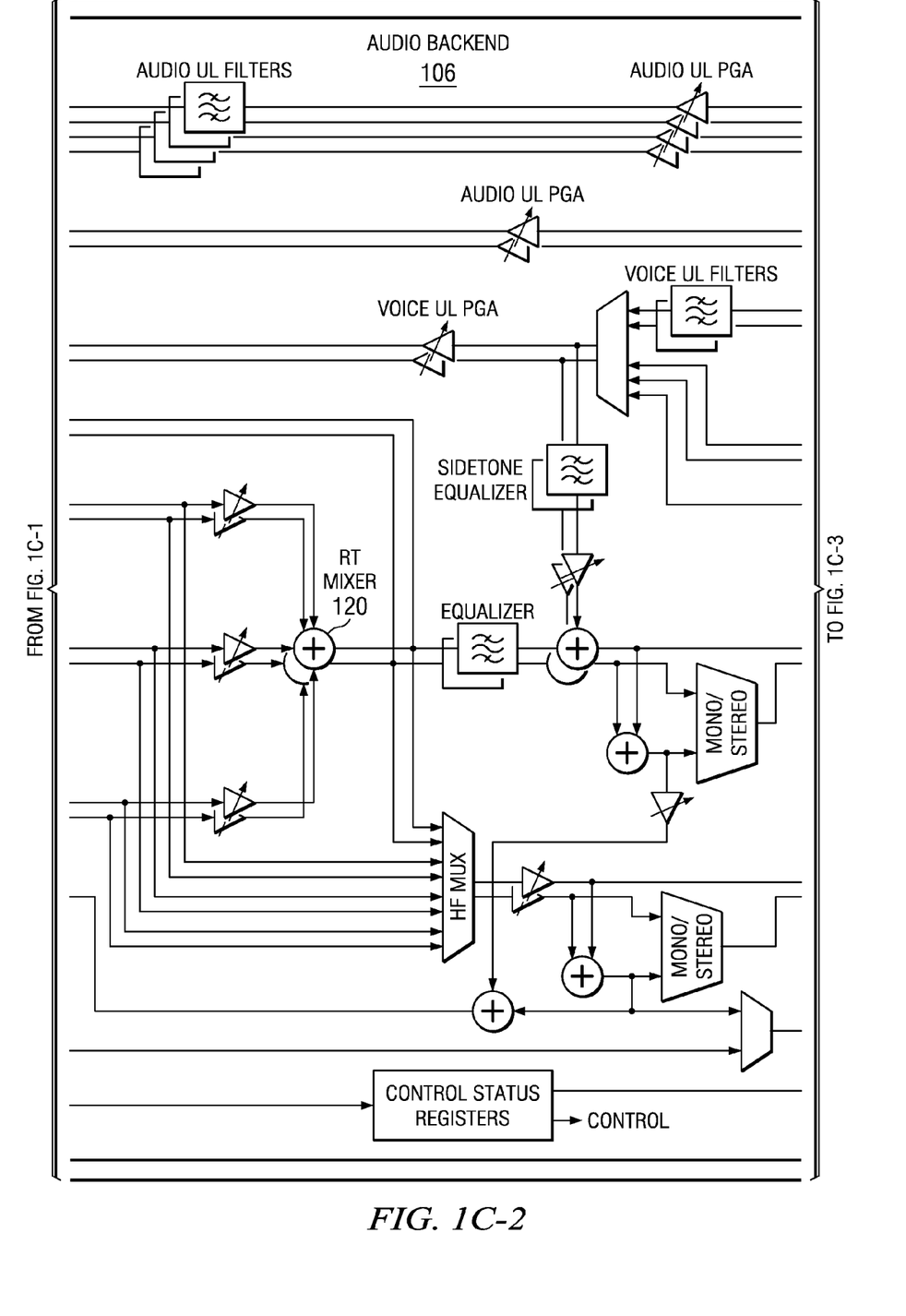
Figure 1C:
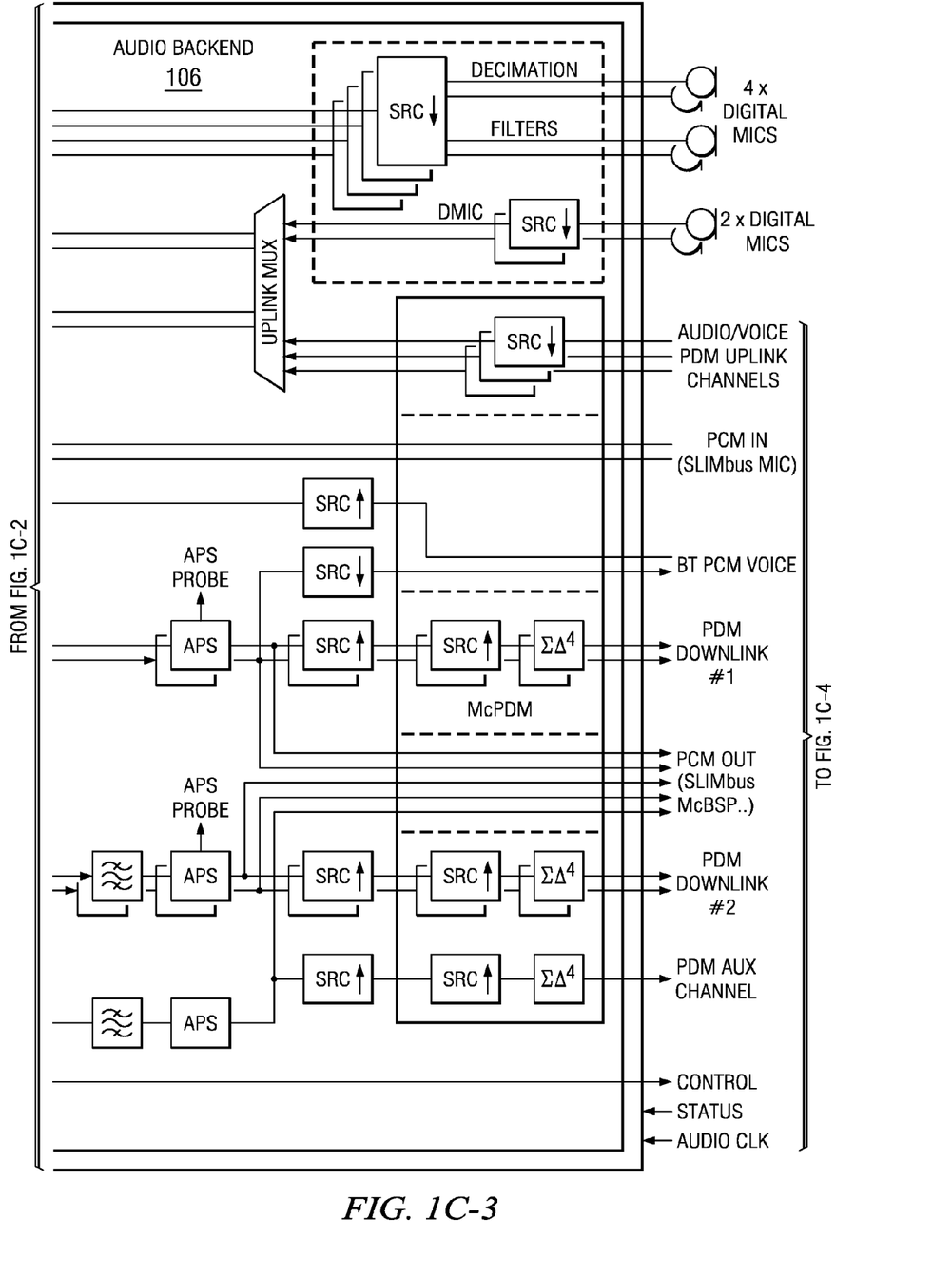
Figure 1C:
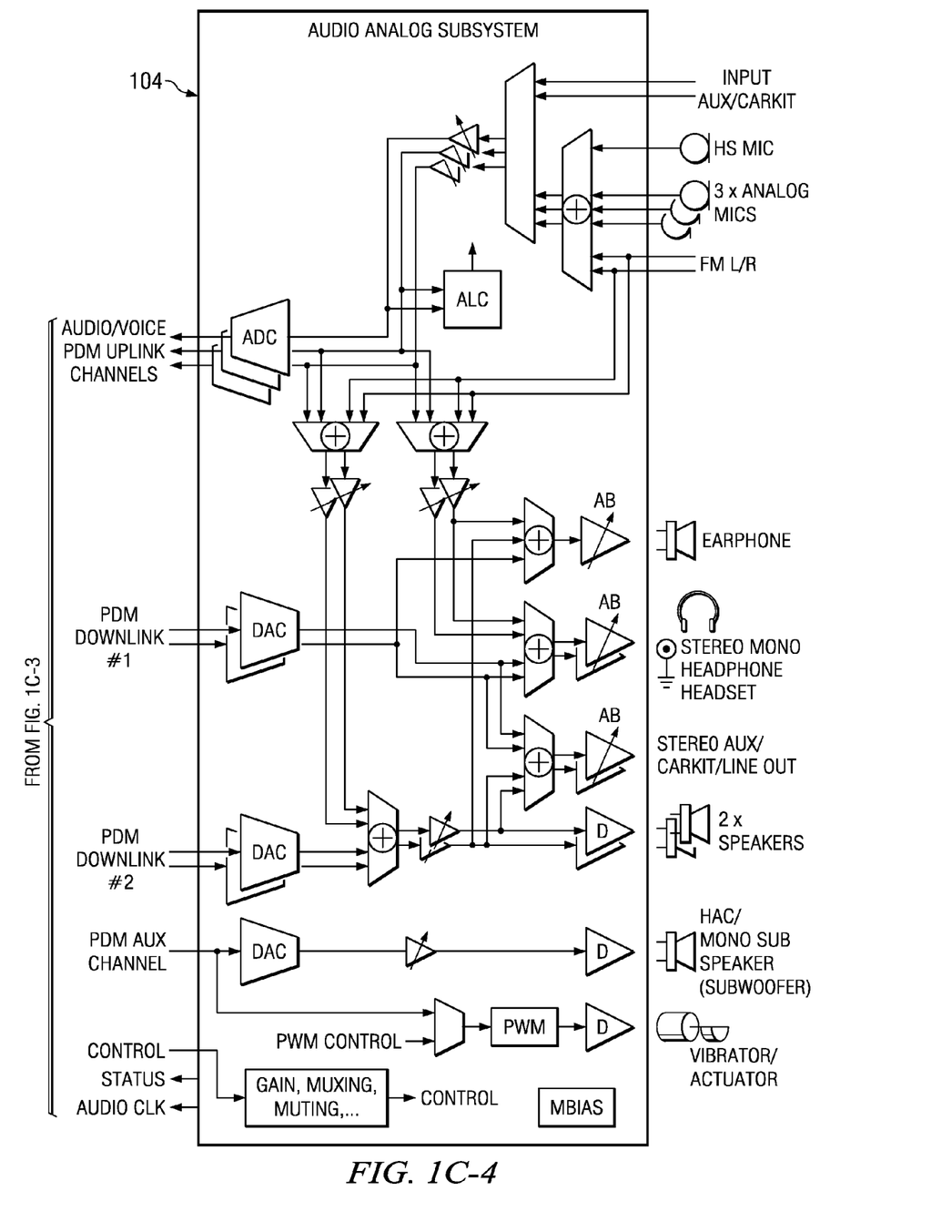

FIG. 1C shows a detailed block diagram of the audio paths in the mobile phone (100) including the independent audio paths for the DSP (108) and the MPU (110) in accordance with one or more embodiments of the invention. These audio paths include an uplink path for voice and multimedia audio, a downlink path for mono earpiece and stereo headphone/headset, a downlink path for stereo hands-free speakers, and a vibrator/actuator path. In one or more embodiments of the invention, the audio paths, muxing, and digital filters are fully programmable. In the diagram of FIG. 1C, the audio path for DSP (108) is the voice/audio downlink path and the audio path for the MPU (110) is the stereo multimedia audio playback path. Separate audio buffers, i.e., voice/audio buffer (160) and audio buffer (162), are used for audio samples decoded by, respectively, the DSP (108) and the MPU (110).

More specifically, in one or more embodiments of the invention, when the DSP (108) begins to receive and decode audio samples, the voice/audio buffer (166) is created in the memory (126) of the audio engine subsystem (122) and the DSP decoded audio samples are sent to the voice/audio buffer (166). Similarly, when the MPU (110) begins to receive and decode audio samples, the audio buffer (164) is created in the memory (126) and the MPU decoded audio samples are sent to the audio buffer (164). Further, the audio paths for the DSP (108) and the MPU (110) in the audio backend (106) may be configured according to the characteristics of the respective audio samples. The decoded audio samples in the audio buffers are subsequently mixed by the digital real-time mixer (120) under control of the audio engine (124) to produce a composite audio signal. In one or more embodiments of the invention, pre-processing such as, for example, source rate conversion, may be performed on the decoded audio samples prior to mixing. The digital real-time mixer (120) is configured to sum mono or stereo downlink voice flow with stereo audio data flow. The digital real-time mixer (120) is also configured to mix ring-tones from a separate path with voice and/or stereo flows. The composite audio signal from the digital real-time mixer (120) may undergo further processing, again under control of the audio engine (124) before being sent to the audio analog subsystem (104) where the composite audio signal is converted to analog and sent to a peripheral device.

Figure 1D:
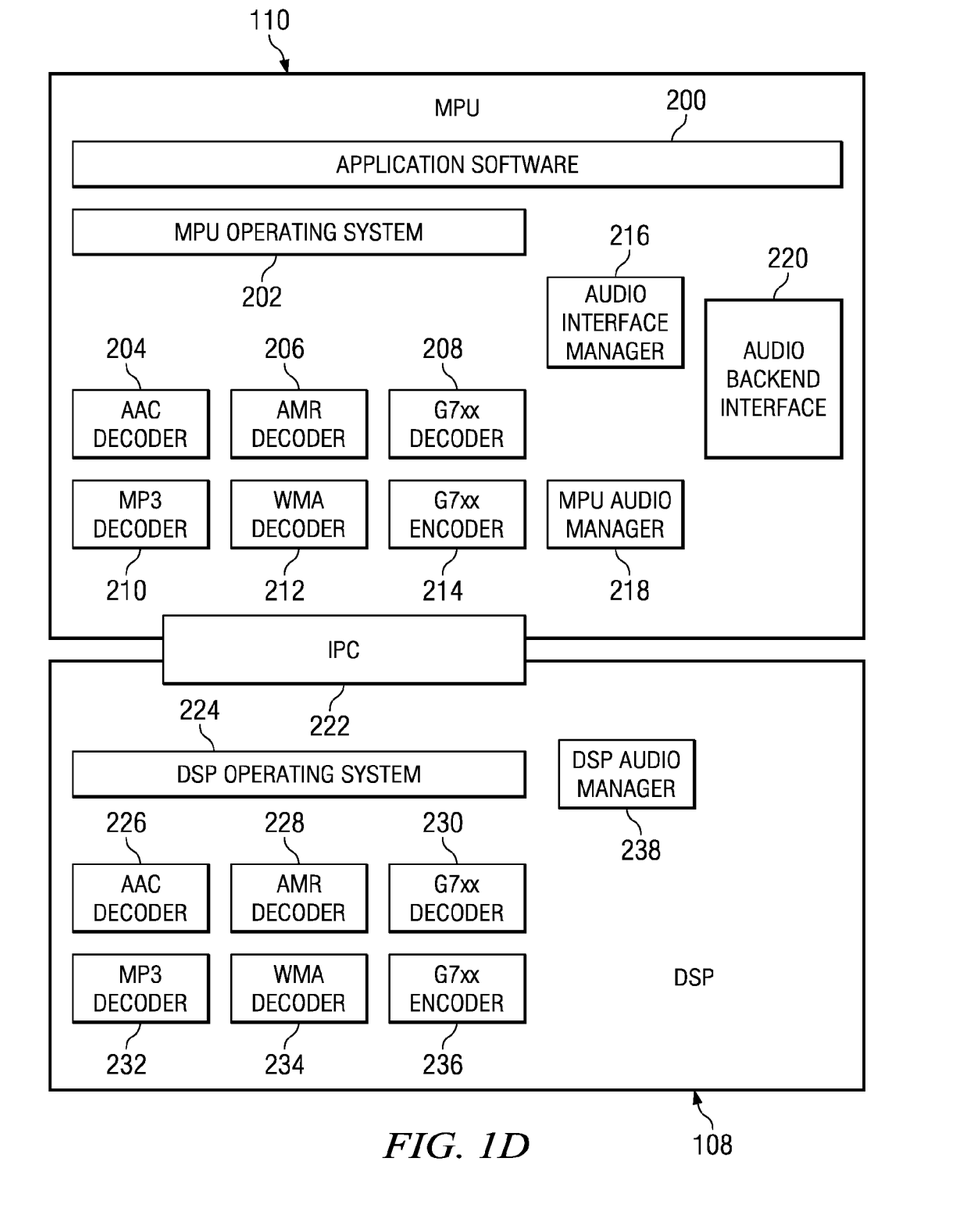

FIG. 1D shows an illustrative software audio processing framework for the mobile phone (100) in accordance with one or more embodiments of the invention. This software audio processing framework includes software components that execute on the MPU (110) and software components that execute on the DSP (108) and an interprocess communication (IPC) interface (222) that provides functionality for communication between the software components executing on the MPU (110) and the software components executing on the DSP (108). Application software (200) (e.g., games, internet browser, electronic mail, audio/video playback, etc.) execute on top of the software audio processing framework. The software components on the MPU (110) may include an MPU operating system (202), various audio decoders (204, 206, 208, 210, 212), an encoder (214), an audio interface manager (216), an MPU audio manager (218), and an audio backend interface (220). The software components on the DSP (108) may include a DSP operating system (224), various audio decoders (226, 228, 230, 232, 234), an encoder (236), and a DSP audio manager (238).

The MPU operating system (202) may be any operating system suitable for a mobile device. Examples of such operating systems include WinCE and Linux Kernel V2.6. The DSP operating system (224) may be any suitable operating system, such as, for example, DSP BIOS from Texas Instruments. The audio decoders on the MPU (110) and the DSP (108) may include decoders for audio formats such as Advance Audio Coding (AAC) (204, 226), Adaptive Multi-Rate (AMR) (206, 228), G.7xx (208, 230), MPEG-1 Audio Layer 3 (MP3) (210, 232), and Windows Media Audio (WMA) (212, 234). The encoders (214, 236) may be G.7xx encoders. The MPU audio manager (218) includes functionality to manage the audio processing on the MPU (110). Similarly, the DSP audio manager (238) includes functionality to manage the audio processing on the DSP (108). Functionality in the audio managers (218, 238) may include loading and configuring any software needed (e.g., a decoder or encoder) to perform audio processing tasks for the applications (200).

The audio interface manager (216) includes functionality to manage the distribution of audio processing between the MPU (110) and the DSP (108) in accordance with the audio processing needs of the applications (200). More specifically, the audio interface manager (216) provides an interface for the applications (200) to request audio processing. The requests from the applications (200) may specify audio processing functionality that is available only on one processor or may allow the audio interface manager (216) to select a processor for performing the audio processing. Because the audio paths for the two processors are independent and programmable, the audio interface manager (216) may use either processor for many audio processing needs. In one or more embodiments of the invention, the audio interface manager (216) may monitor the processing load on both processors and select a processor for a new audio processing task based on both the current processing load and the audio processing capability available for each processor. Further, in some embodiments of the invention, the audio interface manager (216) may move audio processing tasks from one processor to the other based on changing requirements of the applications (200). Once a processor is selected for performing an audio processing task, the audio interface manager communicates with the audio manager (218, 238) on the selected processor to cause the required audio processing to be performed.

The audio backend interface (220) abstracts the audio routing and low-level audio processing features of the audio backend (106). In one or more embodiments of the invention, the audio backend (106) handles digital mixing of decoded audio streams from the MPU (110) and the DSP(108) and post-processing (i.e., gain control, filtering equalization, and acoustic shock protection) of the mixed audio stream and/or audio streams from external peripherals. In one or more embodiments of the invention, the MPU audio manager (218) and the DSP audio manager (238) may communicate directly with the audio backend interface (220) to access audio processing features of the audio backend (106). In some embodiments of the invention, the audio managers (218, 238) may communicate with the audio backend interface (220) through an interface provided by the audio interface manager (216). Whether the communication is direct or through the audio backend interface (220), the audio managers (128, 238) interact with the audio backend interface (220) to configure the audio paths for the respective processors and to provide decoded audio samples to the audio backend (106).

The audio backend interface (220) provides an application programming interface (API) for controlling aspects of the audio backend (106) such as clocking of the serial ports, control of the digital microphone clocks, watchdog and general purpose timer control, the audio traffic controller (142) control of the audio buffers, and the audio engine (124) control of code, parameters, and use case loading and data mapping in the memory (126). The audio backend interface (220) also manages the virtual to physical addressing of OCP peripherals. The audio backend interface (220) also provides for configuration of the signal processing features in the audio backend (106) such as acoustics shock protection, mono/stereo conversion, equalization, side-tone filtering, test loops, dynamic range optimization, AGC, and sample-rate conversion. The API includes both a high-level public interface and a low-level interface for direct access to hardware registers in the audio backend (106).

The API may include interfaces for five operations: open, parameter set, read, write, and close. For example, a software PCM interface may follow the following pseudo-code:

```
Open interface for capture or playback
Set hardware parameters for audio path (access
   mode, data format, channels, rate . . . )
While there is data to be processed:
   Read PCM data (capture)
   Or write PCM data (playback)
Close interface
```

In one or more embodiments of the invention, the audio backend interface (220) does not implement the five operations but provides an abstraction of the audio backend (106) for the implementation of device drivers such as memory mapping of sample buffer locations in the memory (126), addresses of audio engine (124) tuning parameters, interfaces for initialization of components of the audio backend (106), etc.

In one or more embodiments of the invention, the audio backend interface (220) defines internal and external ports as source and sink of samples. Internal ports are originated from the DMA and direct host CPU accesses. External ports correspond to the serial port hardware peripherals. A channel connects an audio port to an external peripheral. Programming of the audio backend (106) through the audio backend interface (220) establishing and configuring the channels. The audio backend interface (220) defines through the API the connection to the input and output ports. It defines the parameters of each port to allow the audio engine (124) to make the necessary translation to the internal computation format (e.g., 24-bit sample width, stereo and 48 kHz) for an audio stream. The audio backend interface (220) also provides an interface for configuring digital mixing operations between audio streams and to tune the post-processing (gain, equalizer, etc . . . ) to apply on the composite samples from the real-time digital mixer (120).

Figure 2:
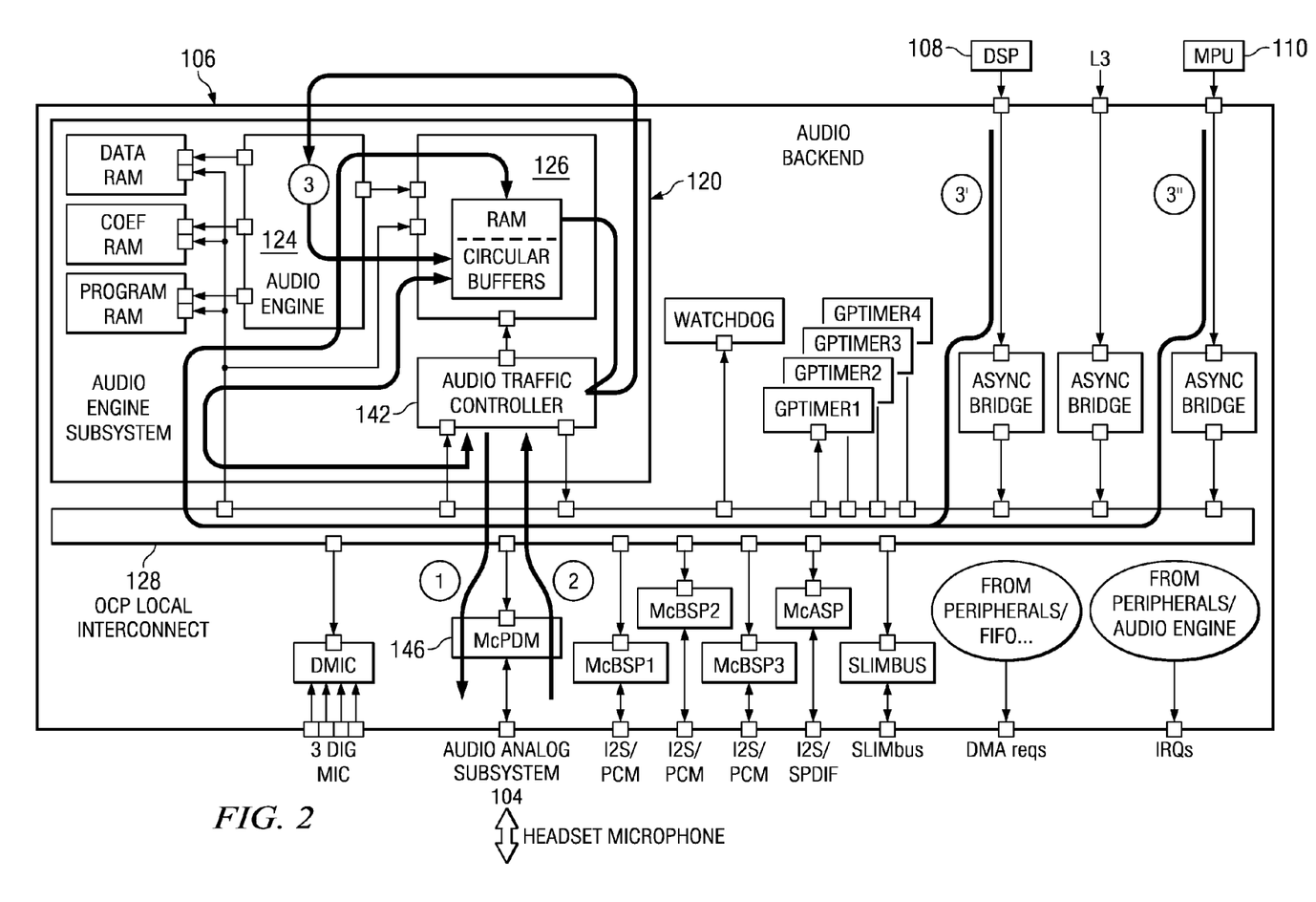
FIG. 2 shows an example of asymmetric independent processing of audio streams in accordance with one or more embodiments of the invention.

FIG. 2 shows an example of asymmetric independent processing of audio streams by the DSP (108) and the MPU (110) in accordance with one or more embodiments of the invention. This example illustrated the operation of the audio backend (106) for an audio processing use case in which MP3 playback is done concurrently with a voice call on the mobile phone (100). This example assumes that MP3 decoding is managed by the MPU (110) and the voice decoding is managed by the DSP (108). Further, the MP3 audio stream decoded by the MPU (110) and the incoming voice audio stream decoded by the DSP (108) are mixed using the real-time digital mixer (120) and sent to a head set connected to the audio analog subsystem (104) through the McPDM interface (146). In addition, the outgoing voice audio stream from a microphone connected to the audio analog subsystem (104) is sent to the audio analog subsystem (104) for processing through the McPDM interface (146) and ultimately to the DSP (108) to be encoded for transmission over a voice link.

For this use case, two circular buffers in the memory (126) are used to send and receive samples to/from the McPDM interface (146), the circular buffer IN for receiving outgoing voice audio samples from the McPDM interface (146) and the circular buffer OUT for sending the mixed MP3 and incoming voice audio samples, i.e., the composite audio samples, to the McPDM interface (146). In addition, three PING/PONG buffers in the memory (126) are used, one for the MP3 playback audio samples from the MPU (110), one for the incoming (downlinked) voice audio samples from the DSP (108), and one for the outgoing (uplinked) voice audio samples. As would be known by one of ordinary skill in the art, ping/pong buffering is a buffering technique in which a pair of buffers is used to receive transmissions. In this buffering technique, one of the buffers receives transmissions while the other buffer is being processed. The two buffers alternate functions, which helps keep transmissions close to continuous.

In the example of FIG. 2, MP3 playback is in progress (i.e., an MP3 use case is executing) on the mobile phone (100) when a voice call is received. The voice call sample frequency is assumed to a multiple of the McPDM frame frequency. With the incoming call, a new use case is to be initiated in the audio backend (106) to handle the combination of the voice call and the MP3 playback. The required buffers in the memory (126) are configured by the host, which is assumed to be the MPU (110). Because MP3 playback is in progress, the PING/PONG buffers for MP3 playback are already in the memory (126). However, the two circular buffers, IN and OUT, for the McPDM interface (146) and the downlink (DL) and uplink (UL) PING/PONG buffers are created in the memory (126). The DL PING buffer is filled with the first decoded voice frame from the DSP (108). Various processing activities of this example are explained in reference to the circled reference numbers in FIG. 2.

At ① the McPDM interface (146) sends a DMA request to the audio traffic controller (142) to request more audio samples from the OUT circular buffer when a threshold is reached in a buffer in the McPDM interface (146). In other words, a buffer for sending audio samples out in the McPDM interface (146) is empty or almost empty and more samples are requested. The audio traffic controller executes the transfer between the OUT circular buffer and the buffer in the McPDM interface (146). The audio samples in the OUT circular buffer may composite audio samples from mixing MP3 samples from the MP3 PING/PONG buffers with voice downlink samples from the DL PING/PONG buffers.

At ② in parallel with ① the McPDM interface (146) sends a DMA request to the audio traffic controller (142) to request transfer of received voice samples from a buffer in the McPDM interface (146) to the IN circular buffer. The audio traffic controller (142) executes the transfer between the buffer in the McPDM interface (146) and the IN circular buffer.

At ③ in parallel with ① the audio engine (124) receives a start event from either from an event generator or a McPDM request to indicate audio samples are present to be processed. The audio engine (124) processes samples from the MP3 PING buffer and the DL PING buffer, the processing including digitally mixing the samples, and writes the resulting composite audio samples to the OUT circular buffer. The audio engine (124) may also process incoming voice samples in the IN circular buffer and write the processed audio samples in the UL PING buffer.

At 3' in parallel with ① the audio engine (124) requests more decoded audio samples from the DSP (108) to fill the DL PONG buffer when a processing threshold in the DL PING buffer is reached. Also, if a threshold in the UL PING buffer is reached, the audio engine (124) requests that the DSP (108) take the audio samples in the UL PING buffer. Also, when this threshold is reached, the audio engine (124) begins filling the UL PONG buffer with uplink voice samples.

At 3" in parallel with ① the audio engine (124) requests more decoded audio samples from the MPU (110) to fill the MP3 PONG buffer when a processing threshold in the MP3 PING buffer is reached.

Figure 3:
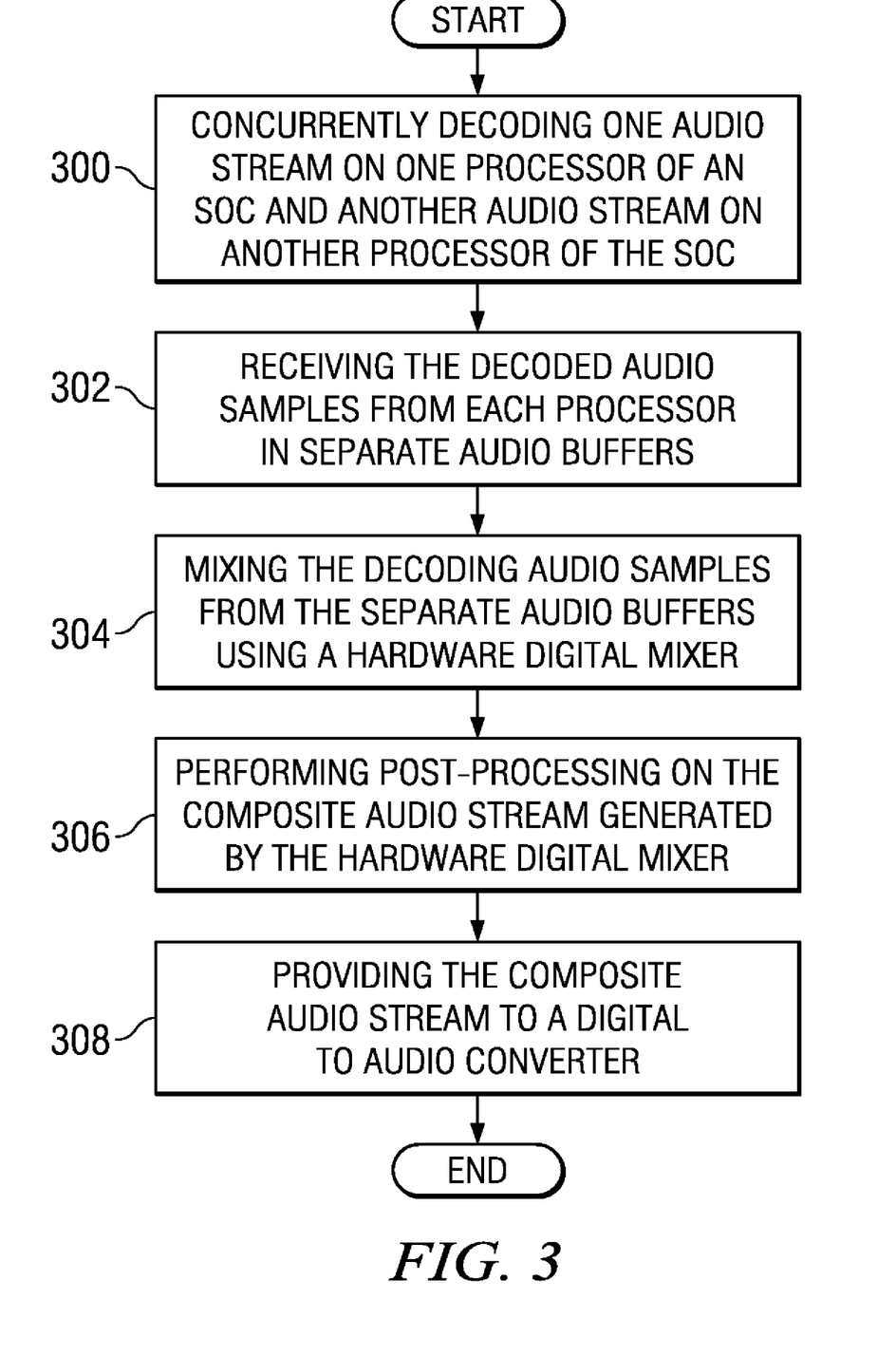
FIG. 3 shows a flow diagram of a method for asymmetric independent processing of audio streams in accordance with one or more embodiments of the invention.

FIG. 3 is a flow diagram of a method for independent processing of audio streams in accordance with one or more embodiments of the invention. Initially, two audio streams are decoded on a system on a chip (SOC) in a mobile device (300). One audio stream is decoded on one processor in the SOC and the other audio stream is decoded concurrently on a second processor in the SOC. Further, decoding of one audio stream may be in progress when decoding of the other audio stream is started. For example, an MP3 playback may be in progress on the mobile device when a voice call is received. A ringtone and the voice call itself may be decoded and provided to the user of the mobile device while the MP3 playback continues and is also heard by the user. In one or more embodiments of the invention, separate audio paths in the SOC for the two processors are configured to handle the processing of the decoded audio samples.

The audio samples decoded by the processors are subsequently processed in independent audio paths. More specifically, the decoded audio samples are received in separate audio buffers (302). That is, the decoded audio samples from one processor are received in one audio buffer and the decoded audio samples from the second processor are received in another, separate audio buffer. In one or more embodiments of the invention, the audio buffers are created in a memory of an audio backend coupled to the processors that is accessible by the processors through separate ports provided in the audio backend for the two processors.

The decoded audio samples in the separate audio buffers are then mixed using a hardware digital mixer to generate a composite audio stream (304). In some embodiments of the invention, pre-processing such as sample rate conversion may be performed on decoded audio samples from one or both of the audio buffers before the mixing is performed. Optionally, post-processing may be performed on the composite audio stream (306). The post-processing may include equalization, sample rate conversion, etc. The composite audio stream is then provided to a digital to analog converter (DAC) for presentation to the user of the mobile device through a peripheral. The audio streams processed by the method may include audio streams in any encoded format including, for example, an AAC encoded audio stream and an MP3 encoded audio stream, a voice call audio stream and an AAC or MP3 encoded stream, an external stereo audio stream (e.g., FM radio) and a voice call audio stream, etc.

While the invention has been described with respect to a limited number of embodiments, those skilled in the art, having benefit of this disclosure, will appreciate that other embodiments can be devised which do not depart from the scope of the invention as disclosed herein. For example, one of ordinary skill in the art will appreciate other embodiments having more than two processors on an SOC configured to process audio streams, each of the audio streams possibly having different characteristics (e.g., encoding formats, sample rates, etc.). In such embodiments, independent audio pathways in an audio backend are provided for each of the multiple processors and the real-time hardware mixer mixes the decoded (and possibly pre-processed) audio samples from each of the multiple processors. Accordingly, the scope of the invention should be limited only by the attached claims. It is therefore contemplated that the appended claims will cover any such modifications of the embodiments as fall within the true scope and spirit of the invention.

What is claimed is:

1. A method for processing audio streams in a device comprising a system on a chip (SOC), the method comprising:
   decoding a first audio stream by a first processor comprised in the SOC;
   decoding a second audio stream by a second processor comprised in the SOC, wherein the decoding of the first audio stream and the second audio stream is performed both concurrently and independently, wherein independently includes that a synchronization between the first processor and the second processor is not needed,
   receiving outgoing audio samples in a first circular audio buffer in a memory comprised in the SOC,
      wherein the memory is configured to store:
         a first audio buffer pair for receiving decoded audio samples from the first processor;
         a second audio buffer pair for receiving decoded audio samples from the second processor;
         a third audio buffer pair for receiving uplinked audio samples; and
   receiving the composite audio stream in a second circular audio buffer in the memory,
   digitally mixing decoded audio samples from the first audio stream and the second audio stream using a hardware digital mixer comprised in the SOC, wherein a composite audio stream is generated;
   receiving the composite audio stream in a second circular audio buffer in the memory;
   wherein digitally mixing further comprises mixing audio samples from the first audio buffer pair with audio samples from the second audio buffer pair and writing the mixed samples to the second circular audio buffer; and
   providing the composite audio stream to a digital to analog converter.

2. The method of claim 1, further comprising:
   configuring a first audio path comprised in the SOC for processing decoded audio samples from the first audio stream; and
   configuring a second audio path comprised in the SOC for processing decoded audio samples from the second audio stream.

3. The method of claim 1, wherein the first audio stream comprises one selected from a group consisting of an audio stream in Advanced Audio Coding (AAC) format and an audio stream in MP3 format and the second audio stream comprises voice samples.

4. The method of claim 1, wherein the first processor is a digital signal processor and the second processor is a general purpose processor.

5. The method of claim 2, wherein the first audio path and the second audio path are comprised in an audio backend of the SOC.

6. The method of claim 1, wherein the memory and the hardware digital mixer are comprised in an audio backend of the SOC.

7. The method of claim 1, wherein providing the composite audio stream further comprises performing post-processing on the composite audio stream before the composite audio stream is provided to the digital to analog converter.

8. The method of claim 1, wherein the device is a cellular telephone.

9. A device comprising:
   a digital to analog convertor (DAC); and
   a system on a chip (SOC) operatively connected to the DAC, the SOC comprising:
      a first processor configured to decode a first audio stream;
      a second processor configured to decode a second audio stream; and
      a hardware digital mixer configured to mix decoded audio samples from the first audio stream and the second audio stream to generate a composite audio stream,
      wherein the SOC further comprises a memory operatively connected to the first processor and the second processor, wherein the memory is configured to store:
a first audio buffer pair for receiving decoded audio samples from the first processor;
a second audio buffer pair for receiving decoded audio samples from the second processor;
a third audio buffer pair for receiving uplinked audio samples;
a first circular audio buffer for receiving outgoing audio samples; and
a second circular audio buffer for receiving the composite audio stream, and
wherein the first audio stream and the second audio stream are decoded both concurrently and independently and the composite audio stream is provided to the DAC, wherein independently includes that a synchronization between the first processor and the second processor is not needed, and
wherein the hardware digital mixer mixes decoded audio samples from the first audio buffer pair and the second audio buffer pair and writes the mixed samples to the second circular audio buffer.

10. The device of claim 9, wherein the SOC further comprises:
a first audio path configured to process decoded audio samples from the first audio stream; and
a second audio path configured to process decoded audio samples from the second audio stream.

11. The device of claim 10, wherein the SOC further comprises an audio backend operatively connected to the first processor and the second processor, wherein the audio backend comprises the hardware digital mixer, the first audio path, and the second audio path.

12. The device of claim 9, wherein the mobile device is a cellular telephone.

13. The device of claim 9, wherein the first audio stream comprises one selected from a group consisting of an audio stream in Advanced Audio Coding (AAC) format and an audio stream in MP3 format and the second audio stream comprises voice samples.

14. The device of claim 9, wherein the first processor is a digital signal processor and the second processor is a general purpose processor.

15. The device of claim 9, wherein the SOC is configured to perform post-processing on the composite audio stream before the composite audio stream is provided to the DAC.

16. A device comprising:
a digital to analog converter (DAC); and
a system on a chip (SOC) operatively connected to the DAC, the SOC comprising:
a first processor configured to decode a first audio stream;
a second processor operatively connected to the first processor and configured to decode a second audio stream; and
an audio backend operatively connected to the first processor by a first port and the second processor by a second port, wherein the audio backend comprises:
a hardware digital mixer configured to mix decoded audio samples from the first audio stream and the second audio stream to generate a composite audio stream; and
a memory configured to store:
a first audio buffer pair for receiving decoded audio samples from the first processor;
a second audio buffer pair for receiving decoded audio samples from the second processor;
a third audio buffer pair for receiving uplinked audio samples;
a first circular audio buffer for receiving outgoing audio samples; and
a second circular audio buffer for receiving the composite audio stream;
wherein the hardware digital mixer mixes decoded audio samples from the first audio buffer pair and the second audio buffer pair and writes the mixed samples to the second circular audio buffer; and
wherein the first audio stream and the second audio stream are decoded both
concurrently and independently and the composite audio stream is provided to the DAC, wherein independently includes that a synchronization between the first processor and the second processor is not needed.

17. The device of claim 16, wherein the audio backend further comprises logic configured to perform post-processing on the composite audio stream before the composite audio stream is provided to the DAC.

18. The device of claim 17, wherein the first audio stream comprises one selected from a group consisting of an audio stream in Advanced Audio Coding (AAC) format and an audio stream in MP3 format and the second audio stream comprises voice samples.

* * * * *